Patented Sept. 26, 1933

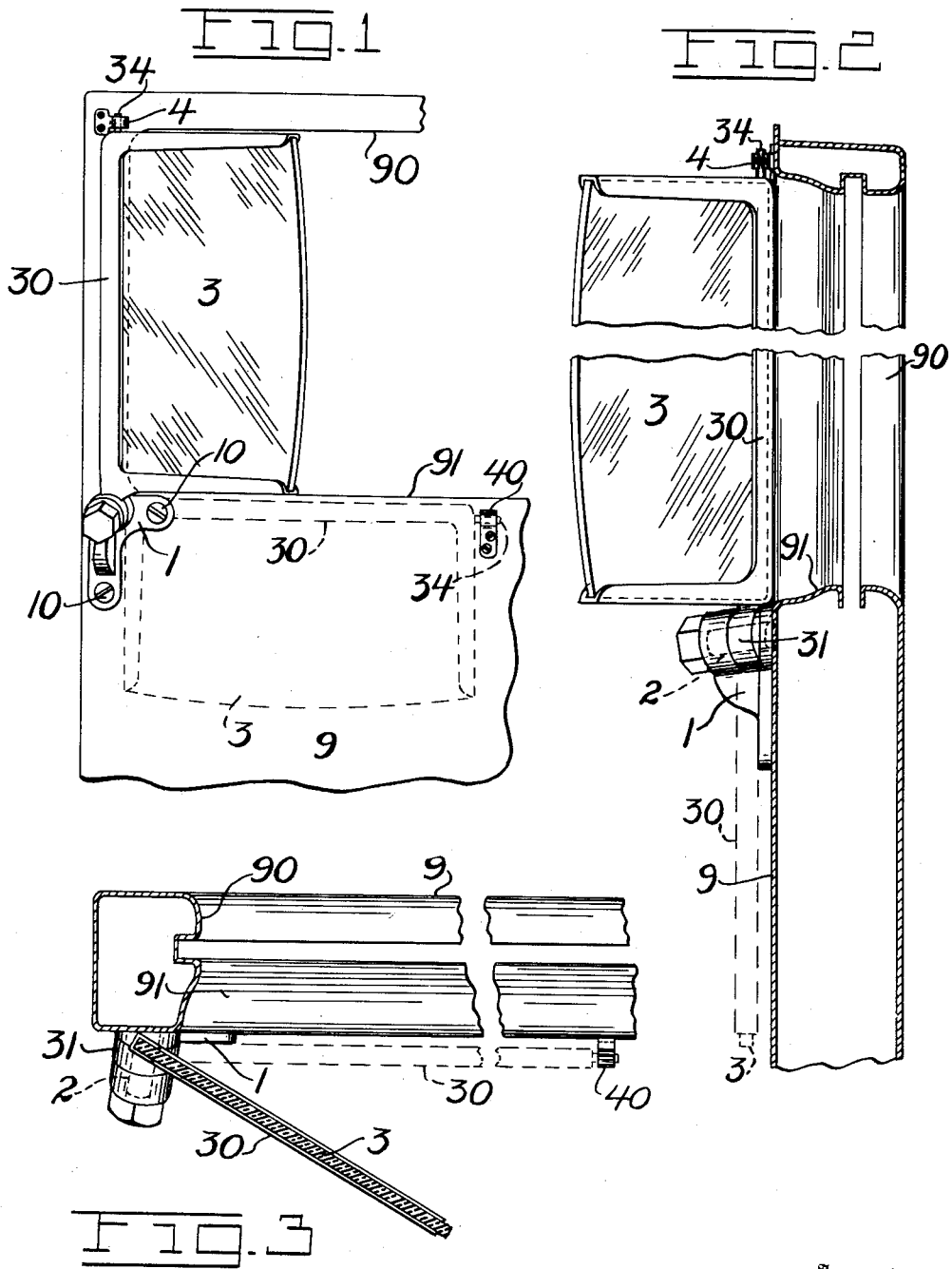

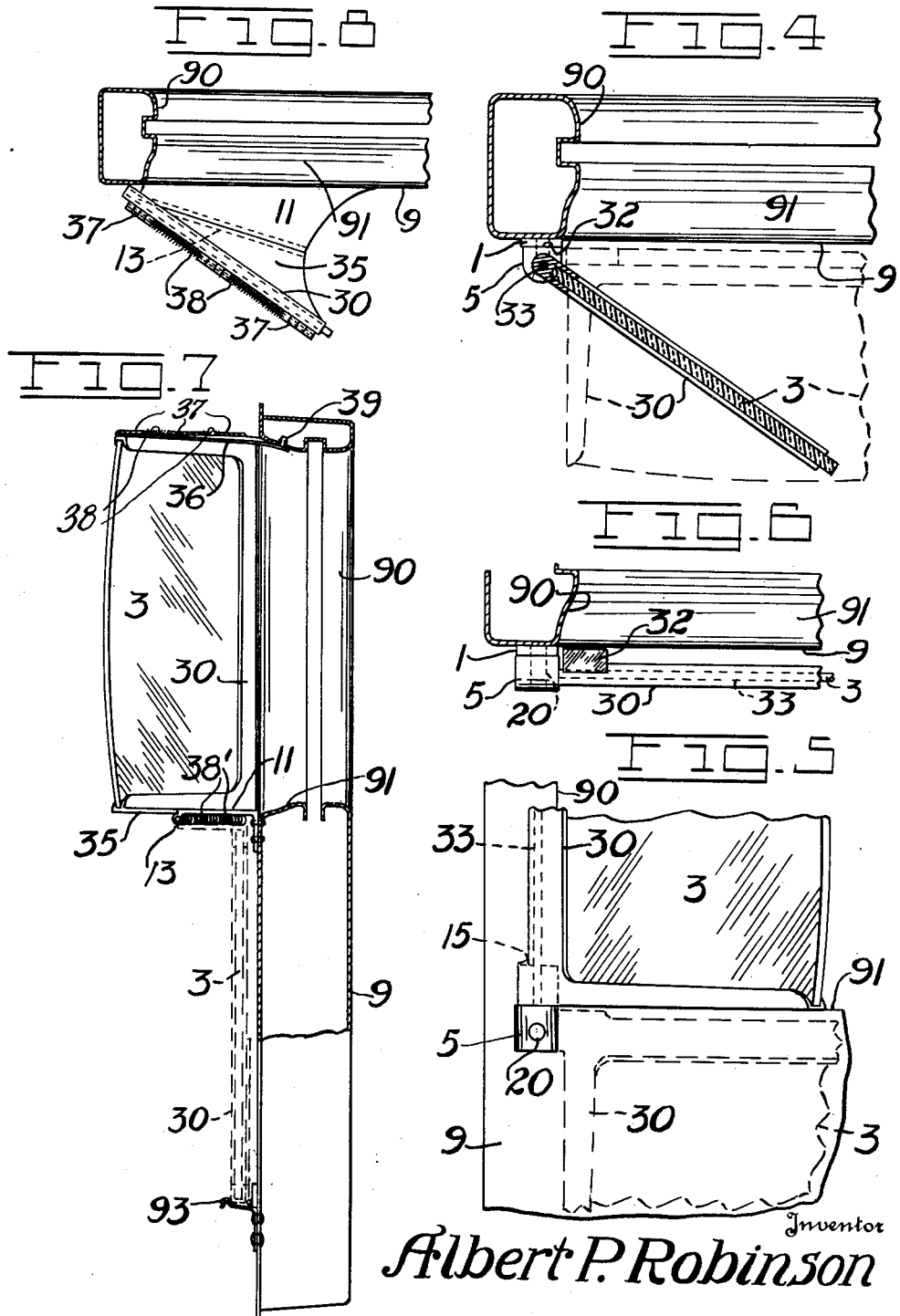

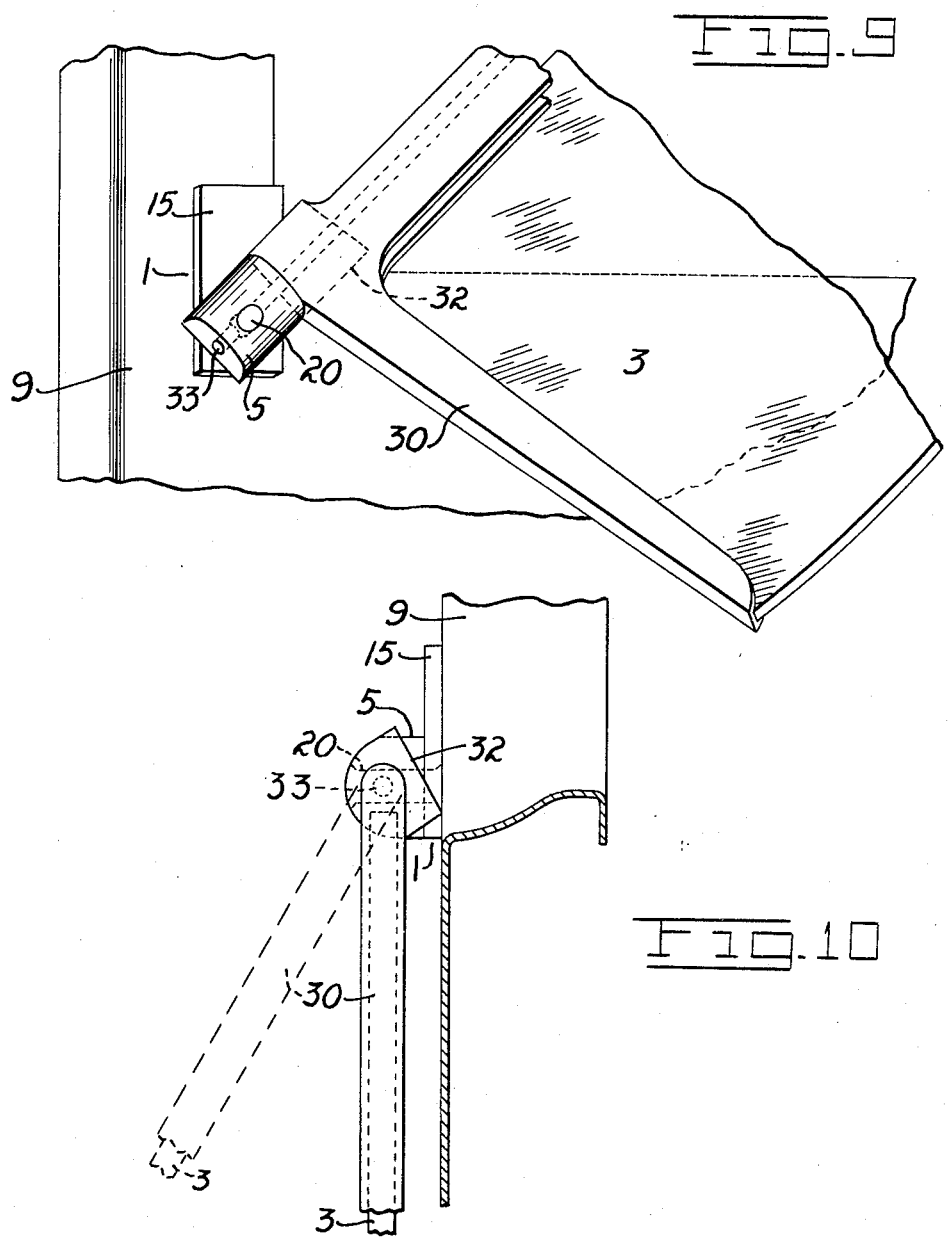

1,928,232

UNITED STATES PATENT OFFICE 1,928,232

PIVOTALLY SUPPORTED WIND WING ATTACHMENT

Albert P. Robinson, Seattle, Wash.

Application March 24, 1931. Serial No. 525,007

14 Claims. (Cl. 296—84)

This invention relates to wind wings or deflectors, such as are in general use upon automobiles, and is an improvement upon the deflectors disclosed in any applications, Serial Nos. 445,929, filed April 21, 1930, now Patent No. 1,919,749, dated July 25, 1933, and 456,028, filed May 27, 1930.

The deflectors of those applications are of types that are adapted to be built into the automobiles, and it is a particular object of the present invention to provide a deflector having in general the same type of movement and simplicity of control, but adapted for attachment to cars now in service. Accordingly, it is an object to provide a pivotal mounting for such a deflector, which can be attached to automobile doors, whereby the deflectotr may be moved from an operative position, inclined outwardly and rearwardly from the forward edge of the window opening, into an inoperative position, where it is swung down outside of the door, substantially at or below the level of the sill, and preferably in a plane substantially parallel to the door upon which it is mounted.

Associated with this object, it is also an object to provide such a mounting and support which will be easy of operation, so that the motorist may move the deflector from inoperative to operative position, or back again, with a minimum of effort and distraction from the control of the car.

My invention comprises the novel parts and the novel combination and arrangement thereof, as shown in the accompanying drawings, described in this specification, and as will be more particularly defined by the claims which terminate the same.

In the accompanying drawings I have shown my invention embodied in such illustrative forms as are now preferred my me.

Figure 1 is a side elevation of the forward portion of an automobile door, showing one form of my invention applied thereto.

Figure 2 is a transverse vertical section through such a door with the deflector applied, and Figure 3 is a transverse horizontal section thereof.

Figure 4 is a transverse horizontal section through a modified form, parts being shown in operative position; Figure 5 is a side elevation of such modified form, and Figure 6 is a view similar to Figure 4, showing the deflector in inoperative position.

Figure 7 is a transverse vertical sectional view of a further modification, and Figure 8 is a transverse horizontal sectional view of the same.

Figure 9 is a perspective view, showing the pivot bracket and associated means of the form shown in Figures 4 to 6 inclusive, and Figure 10 is a plan view of the same.

Many automobiles in operation today are not equipped with wind deflectors notwithstanding their recognized advantages, because they quickly become spotted with rain, dust and mud while in use, thereby becoming a menace to careful driving, obstructing the driver's vision, yet being incapable of quick and easy removal. The present invention offers a means of attaching deflectors to such vehicles in a way that will permit removal from operative position whenever it seems desirable that they be removed, with no delay or trouble, and their subsequent replacement to operative position when needed.

The automobile door 9 is provided with a window opening 90, although so far as the deflector is concerned, this window opening might be in the body or framework of the car itself, rather than in the door. Mounted adjacent the lower front corner of the window opening, in the form shown in Figures 1, 2 and 3, is a pivot bracket 1. This is upon the outside of the door, and may be attached to the door in any convenient manner, as by the bolts 10. Supported in this pivot bracket is a pivot pin 2, which pin is received in a bore of the bracket 1, provided for the purpose, which bore has its axis at an angle. The deflector 3, received usually in a frame 30, has a pivot ear 31 at its lower corner, which fits between ears of the pivot bracket 1 and is apertured to receive the inclined bolt 2.

The operative position of the deflector 3 is such that the forward edge of the deflector, or its frame 30, lies substantially alongside of the forward edge of the window opening 90, the deflector extending outwardly and rearwardly from the forward edge of the window opening 90. The inoperative position of the deflector, as shown in these figures, is such that the theretofore forward edge of the deflector lies substantially horizontal at, and close to, the sill 91 of the window opening, and its theretofore rear edge lies close to the outside surface of the door, and immediately below the now horizontal forward edge of the deflector, as may be seen in Figure 1. In other words, the deflector itself lies in a plane substantially parallel to the plane of the window frame.

I prefer that the deflector move from the operative position described to its inoperative position substantially in one movement, and this may be accomplished by the inclination of the pivot pin 2 referred to above. This pivot pin is inclined outwardly, forwardly and downwardly, with respect to the plane of the window opening and the line of the window sill, and as may be observed in Figures 1, 2 and 3. The inclination may be such that the forward edge of the deflector will swing substantially in the plane of the window frame from the operative to the inoperative position, and such that the rear edge of the deflector will swing from its position outwardly from the plane of the window frame, inwardly as the deflector swings down, until, when the downward movement into inoperative position is completed, it lies substantially in the same vertical plane as the upper, theretofore the forward edge of the deflector.

To hold the deflector in its two limiting positions, there may be provided a frictional or spring catch 4, applied to the upper forward edge of the window opening, and engaging a trunnion or upwardly projecting pin 34 on the deflector, and a similar catch 40 may be provided just outside of the sill in a position to engage the same trunnion.

The same result is accomplished, but by a combination of two movements, in the form shown in Figures 4, 5, 6, 9 and 10. The deflector 3 is supported as before from the pivot bracket 1, but indirectly, through the block 5. This block is pivoted upon the pivot pin 20, projecting horizontally outward from the bracket 1. Secured in this block 5, and projecting perpendicularly to the axis of the pin 20, is a pivot rod 33, upon which the deflector is pivotally mounted. This rod passes through the front edge of the deflector frame 30. Thus the deflector may swing on its rod 33, and may swing, with the block 5 and rod 33, bodily about the pivot pin 20.

To prevent swinging of the deflector inward from its operative position until it has substantially reached its down position, I may provide a lug 32, having a plane surface, and carried by the deflector frame 30, engaging a like surface upon a lug 15 carried by the pivot bracket 1. The two lugs are so proportioned and positioned, as may be seen in Figure 9, showing the deflector part-way down, but still swung outwardly, and in Figure 10, showing it down in the inoperative position, that their surfaces are in engagement while the deflector is in operative position, and this engagement prevents inward swinging of the deflector. When the pivot rod 33 has reached substantially horizontal position, and then only, the lug 32 clears the lug 15, and the deflector may be swung upon its rod 33. Accordingly, to move the deflector from operative to inoperative position, it is necessary that it be swung down about the pivot pin 20, and then, when its forward edge is in substantially horizontal position, its normally rear edge may be swung downward until the deflector reaches a plane substantially parallel to the plane of the window frame. Brackets similar to those already described, may be employed to engage and hold the swinging end of the deflector in its operative and in its inoperative positions. A protective pocket may be provided to enclose the deflector wholly or partially when it is in inoperative position, but has not been illustrated, since its manner of use would be obvious.

In Figures 7 and 8 a further modification has been shown. The pivot bracket 11 in this form extends horizontally outward about level with the sill 91, and extends a considerable distance lengthwise of the sill. A similar bracket 35 extends substantially horizontally inward from the lower edge of the deflector frame 30, and the two brackets 11 and 35 meet and are pivotally connected at 13, along a line which substantially bisects the angle between the lower edge of the deflector 3 and the window sill. By this arrangement the deflector may swing bodily from its upright, operative position, about the pivot axis at 13, into an inoperative position, where its formerly outer face is now inward, toward the outer surface of the automobile door, as may best be seen in Figure 7, and parallel thereto, its heretofore upper edge now lowermost. It remains in this position, substantially parallel to the window frame, being secured by any suitable means, such as the spring catch 93.

To hold the deflector in its operative position, I may provide a bracket member or vane 36 pivoted at 37 upon the upper, outer edge of the deflector frame, there being a spring 38 provided at the pivot axis, the tendency of which is to throw the bracket or vane 36 over the top of the deflector and against that side which is outermost when in operative position. To restrain this tendency and to hold the deflector upraised a friction button or other catch means, as shown at 39, may be provided to engage with complemental means upon the door.

A spring 38' resists tendency of the deflector to fall down, and eases it down when it is permitted to pivot into inoperative position.

What I claim as my invention is:—

1. In an automobile, the combination of a frame defining a window opening, a window glass movable to close said window opening and a deflector independent of such window glass adapted to be disposed, when in operative position, along the front edge of the window opening, and inclined outwardly and rearwardly, and means pivotally supporting the deflector from said frame, for swinging movement between its operative position and an inoperative position, wherein it is disposed below the window sill and outside of and substantially parallel to the plane of the window frame.

2. A wind deflector adapted for use at the front edge of an automobile window, comprising a wind deflecting wing, a pivot bracket adapted to be secured to the window frame at its lower forward corner, and means pivotally supporting the deflector from said bracket to swing from an operative position, inclined outwardly and rearwardly from the forward edge of the window, into inoperative position, parallel to the window and outside of and below the window sill.

3. A wind deflector adapted for dispositions in operative position at the front edge of an automobile window inclined outwardly and rearwardly, comprising a wind deflecting wing, a bracket adapted for attachment to the window frame at its lower forward corner, and a pivot pin supporting said deflector from said bracket, the inclination of the pivot pin relative to the plane of the window frame being such as to produce a simultaneous motion of the deflector inward and also downward, terminating in an inoperative position wherein the deflector lies substantially parallel to and outside of the plane of the window frame, and below the sill level.

4. A wind deflector adapted for use at the front edge of an automobile window, comprising a wind deflecting wing, a bracket adapted for attachment to the window frame at its lower forward corner, and an outwardly projecting pivot pin in said bracket, inclined forwardly and downwardly from such lower forward corner, and supporting said deflector and guiding the same to swing from an operative position wherein it lies in a plane angularly disposed relative to such automobile window, rearwardly and downwardly to an inoperative position wherein it lies in a plane parallel to such automobile window.

5. A wind deflector adapted for use at the front edge of an automobile window, comprising a wind deflecting wing, and pivot means adapted for securement to the outside of the window frame, at its lower front edge, and supportingly engaging and guiding the deflector to swing from operative position, its forward edge coinciding with the forward edge of the window frame, and inclined rearwardly and outwardly from such edge, to inoperative position, its forward edge lying level with the window sill, and extending downward from such edge in a plane substantially parallel to the window frame.

6. A wind deflector adapted for use at the front edge of an automobile window, comprising a wind deflecting wing, and pivot means adapted for securement to the outside of the window frame, at its lower front edge, and supportingly engaging and guiding the deflector to swing from operative position, its forward edge coinciding with the forward edge of the window frame, and inclined rearwardly and outwardly from such edge, its rear edge swinging inward as the forward edge swings downward, to inoperative position, its forward edge lying at the level of and substantially parallel to the window sill, its rear edge lying immediately below the forward edge.

7. A wind deflector adapted for use at the front edge of an automobile window, comprising a wind deflecting wing, a bracket adapted for attachment to the window frame at its lower forward corner, a block pivoted upon said bracket to swing in a plane parallel to the window frame, and pivot means supporting said deflector for pivotal movement upon an axis at right angles to the pivot axis of said block.

8. A wind deflector adapted for use at the front edge of an automobile window, comprising a wind deflecting wing, a bracket adapted for attachment to the window frame at its lower forward corner, a block pivoted upon said bracket to swing in a plane parallel to the window frame, pivot means supporting said deflector for pivotal movement upon an axis at right angles to the pivot axis of said block, and means preventing swinging of the deflector relative to the block until the forward edge of the deflector approaches a level position.

9. A wind deflector adapted for use at the front edge of an automobile window, comprising a wind deflecting wing, a bracket adapted for attachment to the window frame at its lower forward corner, a block pivoted upon said bracket to swing in a plane parallel to the window frame, pivot means supporting said deflector for pivotal movement upon an axis at right angles to the pivot axis of said block, a lug upon the deflector having a surface lying in a plane normal to the axis of the block, and the bracket having a complemental surface, said surfaces being proportioned and disposed to clear when the forward edge of the deflector approaches a level position, thereby permitting inward swinging thereof.

10. A wind deflector adapted for use at the front edge of an automobile window, comprising a wind deflecting wing, a bracket adapted for securement to the window frame at sill level, and extending laterally outward therefrom, a complemental bracket at the lower edge of the deflector, and extending laterally inward, and pivot means joining said complemental brackets along an axis bisecting the angle between the deflector and the window frame.

11. A wind deflector adapted for use at the front edge of an automobile window opening, comprising a wind deflecting wing, a bracket adapted to be secured to the window frame substantially at sill level, and extending laterally outward therefrom, pivot means associated with and disposed in the plane of said bracket at the lower edge of the deflector, and extending in such plane along an axis intermediate the plane of the window opening and the outwardly extended position of the deflector, said pivot means and bracket supporting said deflector to swing the top thereof in a direction transverse to the window opening about such pivot axis and downward to an inoperative position wherein the wing is in a substantially vertical plane.

12. A wind deflector adapted for use at the front edge of an automobile window, comprising a wind deflecting wing, a bracket adapted for securement to the window frame at sill level, and extending laterally outward therefrom, a complemental bracket at the lower edge of the deflector, and extending laterally inward, pivot means joining said complemental brackets along an axis bisecting the angle between the deflector and the window frame, a brace pivotally supported along the upper edge of the deflector, and means interengageable between said brace and the window frame to retain the deflector in upright position.

13. A wind deflector adapted for use at the front edge of an automobile window, comprising a wind deflecting wing, a bracket adapted for securement to the window frame at sill level, and extending laterally outward therefrom, a complemental bracket at the lower edge of the deflector, and extending laterally inward, pivot means joining said complemental brackets along an axis bisecting the angle between the deflector and the window frame, a brace pivotally supported along the upper edge of the deflector, means interengageable between said brace and the window frame to retain the deflector in upright position, and spring means to throw said brace, when released, against that side of the deflector which is outermost when it is in upright position.

14. A wind deflector adapted for use at the front edge of an automobile window, comprising a wind deflecting wing, a pivot bracket adapted for securement at the lower forward corner of the window opening, and a pivotal connection between the deflector and the pivot bracket along an inclined axis, the pivot members being so arranged and disposed as to swing the forward edge of the deflector downward in a plane parallel to the plane of the window opening, the rear edge of the deflector simultaneously swinging inward towards such plane of swing to the forward edge, to lie therein when the forward edge reaches substantially horizontal position.

ALBERT P. ROBINSON.